No. 747,976. PATENTED DEC. 29, 1903.
P. JUNOD.
TROLLING SPOON OR SPINNER.
APPLICATION FILED JUNE 5, 1903.
NO MODEL.
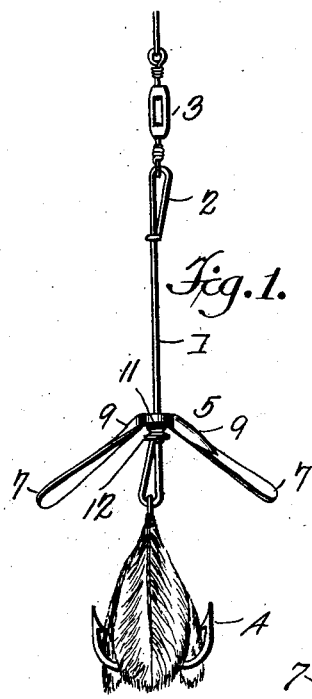
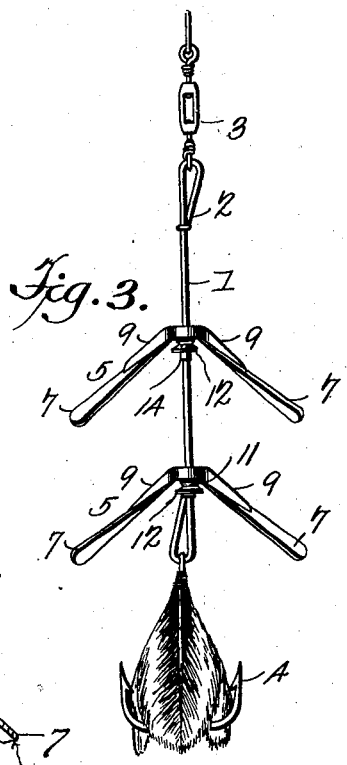
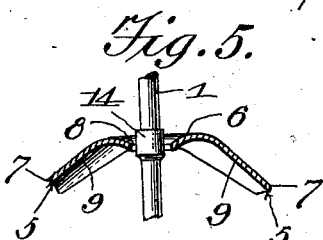
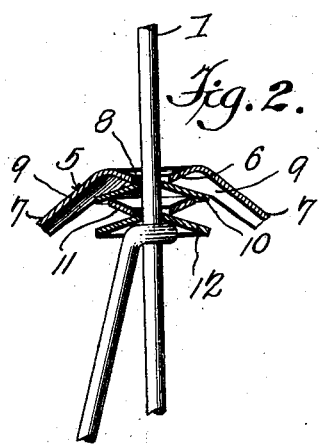
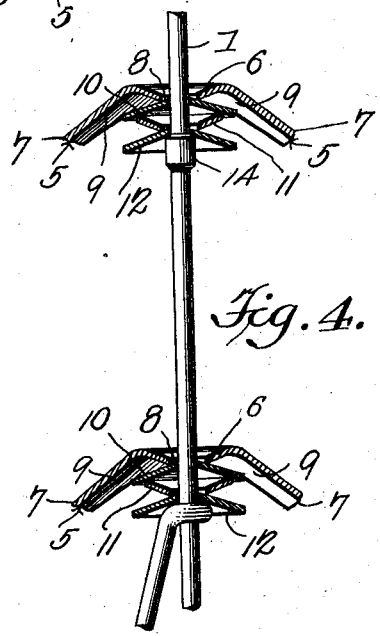
Paul Junod, Inventor, No. 747,976. Patented December 29, 1903.

UNITED STATES PATENT OFFICE.

PAUL JUNOD, OF CELINA, OHIO.

TROLLING SPOON OR SPINNER.

SPECIFICATION forming part of Letters Patent No. 747,976, dated December 29, 1903.

Application filed June 5, 1903. Serial No. 160,235. (No model.)

*To all whom it may concern:*

Be it known that I, PAUL JUNOD, a citizen of the United States, residing at Celina, in the county of Mercer and State of Ohio, have invented a new and useful Trolling Spoon or Spinner, of which the following is a specification.

This invention relates to trolling spoons or spinners.

The object of the invention is to produce a spinner which may be more readily rotated than spinners as heretofore constructed, which will have less tendency to catch trash floating in the water and become encumbered thereto, which shall be capable of more irregular movement than the ordinary type of spinner, and the construction of which shall be simpler and cheaper than that of spinners of the ordinary type.

With the object above stated and others in view, as will appear when the invention is more fully disclosed, the same consists in the construction and combination of parts of a trolling spoon or spinner, as hereinafter described, illustrated in the accompanying drawings, forming a part of this specification, and having the novel features thereof particularly pointed out in the appended claims.

In the drawings, Figure 1 is a view in side elevation of a form of embodiment of the invention having a single spinner. Fig. 2 is a detail view in section, showing the mode of supporting the spinner of Fig. 1 on its shaft. Fig. 3 is a view in side elevation of an embodiment of the invention having two spinners. Fig. 4 is a detail view showing the mode of supporting the two spinners of Fig. 3 upon their shaft. Fig. 5 is a detail view to show the passage of the rear spinner over the enlargement of the shaft.

Corresponding parts are designated by the same characters of reference in the several views in which they appear.

Referring to the drawings by reference characters, 1 designates a shaft or standard provided at each end with a loop 2, to one of which is secured a swivel 3 and to the other of which is attached a hook 4, preferably provided with a plurality of prongs concealed in the usual manner by a gaily-colored bunch of feathers or other bright-colored material adapted to deceive the fish and induce them to bite at the hook.

Freely rotatable upon the shaft 1 is a spinner 5, having a hub portion 6 and a pair of oppositely-disposed inclined arms 7. The arms 7 are bent back toward the hook at the rear of the shaft 1 and are preferably slightly twisted, so that the action of the water thereon may cause the rotation of the spinner upon the shaft. The hub 6 of the spinner is preferably formed by stamping, so as to present on the forward surface of the hub a convexity of the form shown, and at the center of the hub is formed an opening 8, considerably larger than the shaft 1 and having the margin thereof turned toward the rear for a purpose that will hereinafter appear. At opposite sides of the hub 6 and forming the connection between the hub and the arms 7 are ribs 9, also formed by stamping and presenting on the forward surface thereof a convexity and on the rearward surface a concavity. The ribs 9 serve the double purpose of forming a stiff connection between the hub 6 and the plates 7 and also presenting a convex surface over which small particles of grass or weeds floating in the water will slip readily without becoming entangled with the spinner.

In order to give sufficient stiffness to the spinners as heretofore constructed when light material, such as that employed in my improved form of spinner, is employed, a brace has been placed between the plates of the spinner and disposed transversely of the shaft, for which an opening is provided in the center of the brace. Such a construction is undesirable, for the reason that the attachment of the brace is an additional item of expense, because the transverse members having both ends attached to the spinner-blades form an obstacle against which particles of grass and weeds are prone to catch, thereby checking the movement of the spinner, and because the brace holds the spinner against any rocking movement in a plane parallel with the axis of the shaft.

By providing the stamped ribs 9 I am able to dispense with the brace between the spinner-blades, because the ribs give sufficient stiffness without increasing the weight of the spinner, and the ribs present a surface over which small particles of floating rubbish pass readily without lodging.

To provide for free rocking movement of the spinner in planes parallel with the axis of the shaft, the opening 8 in the hub is made large, as above stated, and the margin thereof which is directed rearward rests upon the convex surface of a small conical washer 10, which lies immediately behind the spinner. The washer 10 has a comparatively small central opening just large enough to permit free rotation thereof about the shaft 1, and immediately behind the washer 10 is a similar conical washer 11, oppositely disposed and provided with a larger central opening. Behind the washer 11 is a third washer 12, also of conical form and having the convex surface thereof directed forward, as shown. The opening in this washer is smaller than that in the washer 11, which accordingly fits over the apex of washer 12. This arrangement of the washers, which form an abutment against which the spinner 5 rests, affords, as will be readily observed, a bearing-surface upon which the spinner rocks with the utmost freedom and which does not in any way impede its rotation about the shaft 1.

In Fig. 3 there is illustrated a modified form of the invention in which two spinners are mounted upon the shaft. The construction of the spinners is identical with that of the spinner already described, and the only difference in the two forms of the invention is found in the fact that the shaft 1 is made somewhat longer in the modified form and is provided intermediate of the loops with an enlargement 14, which forms an abutment against which the washers of the forward spinner are pressed by the action of the water on the spinner. The washers of the rearward spinner rest against the rear loop, as in the form of the invention first described.

In the modified form of the invention a function appears which is unnecessary in and which is absent from the form first described. The enlargement 14 upon the shaft 1 is made sufficiently small for the rearward spinner to pass forward over it when a fish strikes, so permitting the spinner to move out of the way and go forward into contact with the washers supporting the forward spinner.

It will readily be seen that in both forms of the invention as hereinbefore described the spinners are of very simple and inexpensive construction, being formed by a single stamping operation and not requiring the soldering or attaching by other means of brace members or the like. It will also be seen that the spinners are susceptible of rocking movement upon the shaft as well as rotary movement around it, thereby permitting greater irregularity of movement, and hence producing an appearance more calculated to attract fish than that produced by a single spinner which rotates in a fixed path only.

While I have described and shown the construction of the preferred forms of embodiment of my invention, it will be obvious that numerous changes may be made in the form, proportions, and other minor constructive details thereof without departing from the spirit of the invention or sacrificing any of its advantages.

Having thus described the construction and advantages of my invention, what I claim as new, and desire to secure by Letters Patent, is—

1. In a trolling spoon or spinner, a rotary member bent to present oppositely-inclined blades each of which has a rounded strengthening-rib formed upon the forward surface.

2. In a trolling spoon or spinner, a rotary member having a hub presenting a convex forward surface and a pair of oppositely-disposed inclined blades each having on its forward surface a rounded strengthening-rib formed integral with the hub and blades.

3. In a trolling spoon or spinner, a shaft, a member mounted for rotation on said shaft and comprising a hub having a central aperture considerably larger than said shaft, the margin of the aperture being bent rearward, and a conical member carried by said shaft and forming an abutment to limit the rearward movement of the rotary member on said shaft.

4. In a trolling spoon or spinner, a shaft, a rotary member mounted on said shaft, and a plurality of concavo-convex washers mounted on the shaft at the rear of said rotary member, alternate washers being disposed with the convex surfaces forward and the intervening washers being disposed with their convex surfaces rearward.

5. In a trolling spoon or spinner, a shaft, a rotary member mounted on said shaft and having a central opening considerably larger than said shaft, a concavo-convex washer immediately behind said rotary member and having its convex surface disposed forward, a second concavo-convex washer behind the first-mentioned washer and oppositely disposed, and a third concavo-convex washer behind the second washer and disposed similarly to the first washer.

6. In a trolling spoon or spinner, a shaft having an enlargement intermediate of its ends, a rotary member mounted on said shaft in advance of the enlargement, means for preventing the movement of said member to the rear of said enlargement, and a rotary member mounted on said shaft behind the enlargement and having a central opening large enough to pass over said enlargement.

In testimony that I claim the foregoing as my own I have hereto affixed my signature in the presence of two witnesses.

PAUL JUNOD.

Witnesses:
N. W. TAYLOR,
M. TAYLOR.